US012644432B1

(12) United States Patent
Hu et al.

(10) Patent No.: US 12,644,432 B1
(45) Date of Patent: Jun. 2, 2026

(54) VARIABLE RADIUS IMPELLER

(71) Applicant: AIRGREENING (CANADA) INC., Markham (CA)

(72) Inventors: Jixian Hu, Richmond Hill (CA); Yuehao Hu, Richmond Hill (CA); Jiawen Zhu, Toronto (CA); Pengyi Liao, Brossard (CA)

(73) Assignee: AIRGREENING (CANADA) INC., Markham (CA)

( * ) Notice: Subject to any disclaimer, the term of this patent is extended or adjusted under 35 U.S.C. 154(b) by 0 days.

(21) Appl. No.: 19/095,857

(22) Filed: Mar. 31, 2025

Related U.S. Application Data

(63) Continuation of application No. PCT/IB2025/053298, filed on Mar. 28, 2025.

(51) Int. Cl.
F03D 3/06 (2006.01)
F03D 3/00 (2006.01)

(52) U.S. Cl.
CPC .............. F03D 3/067 (2013.01); F03D 3/005 (2013.01); *F05B 2240/211* (2013.01)

(58) Field of Classification Search
CPC .......... F03D 3/005; F03D 3/007; F03D 3/009; F03D 3/011; F03D 3/066; F03D 3/067; F05B 2240/211–218
See application file for complete search history.

(56) References Cited

U.S. PATENT DOCUMENTS

| | | | | |
|---|---|---|---|---|
| 1,707,507 | A | * | 4/1929 | Burch ..................... F03D 3/067 416/132 B |
| 4,049,362 | A | * | 9/1977 | Rineer ................... F03D 3/067 416/119 |
| 4,293,274 | A | * | 10/1981 | Gilman .................... F03D 7/06 416/88 |
| 4,383,801 | A | * | 5/1983 | Pryor ..................... F03D 3/068 416/17 |

(Continued)

FOREIGN PATENT DOCUMENTS

| | | |
|---|---|---|
| CN | 103670941 B | 2/2016 |
| CN | 110360052 A | 10/2019 |

(Continued)

OTHER PUBLICATIONS

Rathore, Mukesh Kumar et al., "Pitch control mechanism in various type of vertical axis wind turbines: a review." Journal of Vibration Engineering & Technologies 9.8 (2021): 2133-2149.

*Primary Examiner* — Sang K Kim
(74) *Attorney, Agent, or Firm* — Perry + Currier Inc.

(57) ABSTRACT

The present specification relates to a variable radius impeller comprising: a frame assembly configured for coupling to a generator; a plurality of blades for generating rotational force around an axis of rotation defined by the frame assembly, each blade rotatably mounted to the frame assembly; and a plurality of actuation rods, each actuation rod operably connected to an opposing pair of the plurality of blades, the opposing pair comprising a first blade and a second blade; wherein a driving force of wind on an outer (Continued)

surface of the first blade causes the first blade to move in a closing direction to decrease wind resistance, which in turn causes the corresponding actuation rod to simultaneously push the second blade in an opening direction to increase wind capture.

9 Claims, 7 Drawing Sheets

(56)                    References Cited

U.S. PATENT DOCUMENTS

| | | | |
|---|---|---|---|
| 6,320,273 B1 * | 11/2001 | Nemec | F03D 7/0228 |
| | | | 290/43 |
| 7,780,411 B2 * | 8/2010 | Yan | F03D 3/067 |
| | | | 415/60 |
| 9,133,823 B2 | 9/2015 | Jaw et al. | |
| 9,284,947 B2 * | 3/2016 | Xia | F03D 3/067 |
| 9,695,803 B2 | 7/2017 | Kang et al. | |
| 10,539,115 B1 | 1/2020 | Rodrigues et al. | |
| 11,530,682 B2 * | 12/2022 | Rodrigues | F03D 3/0427 |
| 2011/0006526 A1 * | 1/2011 | Hemmingsson | F03D 3/068 |
| | | | 290/44 |

FOREIGN PATENT DOCUMENTS

| | | |
|---|---|---|
| CN | 111577532 A | 8/2020 |
| CN | 107559138 B | 12/2023 |
| RU | 2320890 C1 | 3/2008 |
| RU | 2791793 C1 | 3/2023 |
| WO | WO-2022106979 A1 | 5/2022 |

* cited by examiner

VARIABLE RADIUS IMPELLER

CROSS-REFERENCE TO RELATED APPLICATIONS

This application is a continuation of PCT Application No. PCT/IB2025/053298, filed Mar. 28, 2025, the entire contents of which is incorporated herein by reference.

FIELD

The present specification relates generally to impellers for wind turbines and more particularly to variable radius impellers.

BACKGROUND

Impellers in wind turbines have multiple blades that capture wind energy to generate rotational motion, which is then converted into electrical energy by a generator. Despite their ability to harness renewable energy, impellers of the prior art face several challenges, one of which is energy loss due to aerodynamic drag and counterproductive forces. At any given time, certain blades may be positioned in a way that creates resistance instead of contributing to the impeller's rotation. This is especially prevalent in vertical-axis designs, where half of the blades often move against the wind, reducing efficiency and limiting power output.

Another drawback is the dependency on wind conditions. Wind turbine impellers require a minimum wind speed to initiate rotation and generate usable power. In low-wind environments, starting torque can be insufficient, necessitating additional mechanical or electrical assistance to overcome inertia.

SUMMARY

An aspect of the specification provides a variable radius impeller comprising: a frame assembly configured for coupling to a generator; a plurality of blades for generating rotational force around an axis of rotation defined by the frame assembly, each blade rotatably mounted to the frame assembly; and a plurality of actuation rods, each actuation rod operably connected to an opposing pair of the plurality of blades, the opposing pair comprising a first blade and a second blade; wherein a driving force of wind on an outer surface of the first blade causes the first blade to move in a closing direction to decrease wind resistance, which in turn causes the corresponding actuation rod to simultaneously push the second blade in an opening direction to increase wind capture.

An aspect of the specification provides a variable radius impeller wherein the frame assembly comprises: a top plate; a bottom plate spaced apart from the top plate; and a central shaft connected to the top plate and extending through the bottom plate, the central shaft configured for coupling to the generator.

An aspect of the specification provides a variable radius impeller wherein the blade is rotatably mounted to the frame assembly by a pivot shaft positioned along a longitudinal side of each blade, pivotally connecting the blade to the frame assembly.

An aspect of the specification provides a variable radius impeller wherein each blade has a connecting element, the actuation rod connecting the connecting element of the first blade to the connecting element of the second blade.

An aspect of the specification provides a variable radius impeller wherein the connecting element comprises a connecting shaft extending along a longitudinal axis of each blade.

An aspect of the specification provides a variable radius impeller wherein the connecting element further comprises a bearing for reducing friction.

An aspect of the specification provides a variable radius impeller wherein the bearing comprises a roller bearing or a ball bearing.

An aspect of the specification provides a variable radius impeller wherein each actuation rod is connected to the corresponding opposing pair of the plurality of blades at vertically offset positions relative to adjacent actuation rods to prevent mechanical interference during movement of the plurality of blades.

An aspect of the specification provides a variable radius impeller wherein the frame assembly further comprises a plurality of stop members, each stop member positioned to limit a range of motion of a corresponding blade as the blade moves in the closing direction.

DETAILED DESCRIPTION

Figure 1:
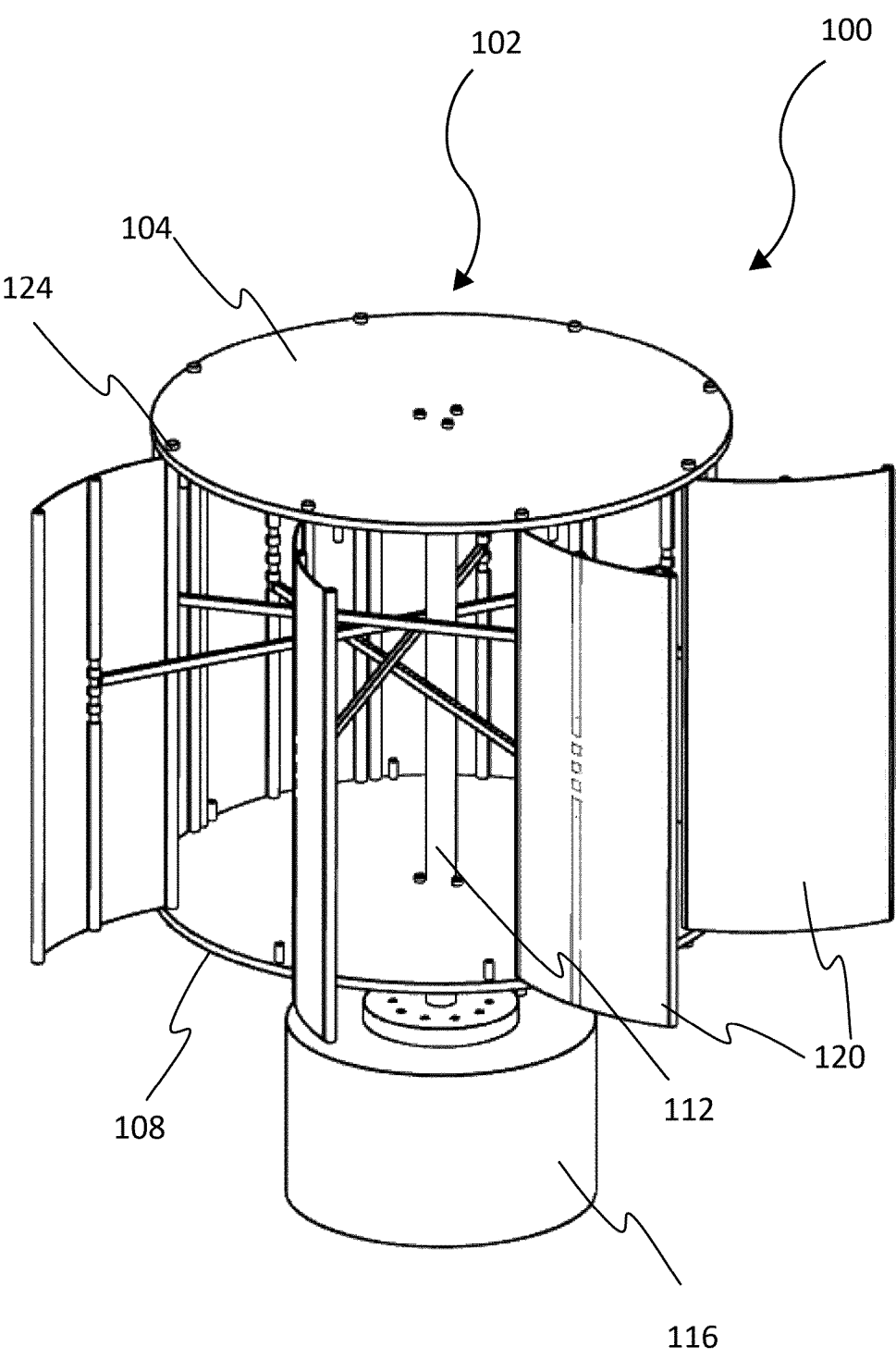
FIG. 1 shows a perspective view of a variable radius impeller in accordance with an embodiment.

Referring now to FIG. 1, a variable radius impeller is indicated generally at 100. The variable radius impeller 100 has a frame assembly 102 for supporting the components of the variable radius impeller 100. In a present embodiment, the frame assembly 102 includes a top plate 104, a bottom plate 108 spaced apart from the top plate 104, and a central shaft 112 connected to the top plate 104 and extending through the bottom plate 108. The top plate 104 and the bottom plate 108 can have a variety of shapes, but in a present embodiment, the top plate 104 and the bottom plate 108 are circular.

The frame assembly 102 is configured for coupling to a generator 116. In a present embodiment, the central shaft 112 is configured for coupling to the generator 116. The generator 116 is not limited to a particular type of generator, but in a present embodiment, the generator 116 can be a radial flux generator, an axial flux generator, or a printed circuit board stator generator.

The variable radius impeller 100 has a plurality of blades 120 for generating rotational force around an axis of rotation defined by the frame assembly 102. In a present embodiment, the blades 120 generate rotational force around the central shaft 112. The blades 120 are shaped to capture wind energy. In a present embodiment, the blades 120 are rectangular with a slight curvature, as shown in FIG. 1, and have a concave inner surface and a convex outer surface. However, the blades 120 are not limited to this shape and other shapes can be used. The blades 120 are constructed of a material capable of withstanding the force of the wind. The material of the blades 120 is not particularly limited, but in a present embodiment, the blades can be made of aluminum alloy, wood, or composites with glass fiber or carbon fiber and a suitable binder.

Each blade 120 is rotatably mounted to the frame assembly 102. In a present embodiment, and as shown in FIG. 1, each blade 120 is rotatably mounted to the frame assembly 102 by a pivot shaft 124 positioned along a longitudinal side of each blade 120, pivotally connecting the blade 120 to frame assembly 102, specifically the top plate 104 and the bottom plate 108.

Figure 2:
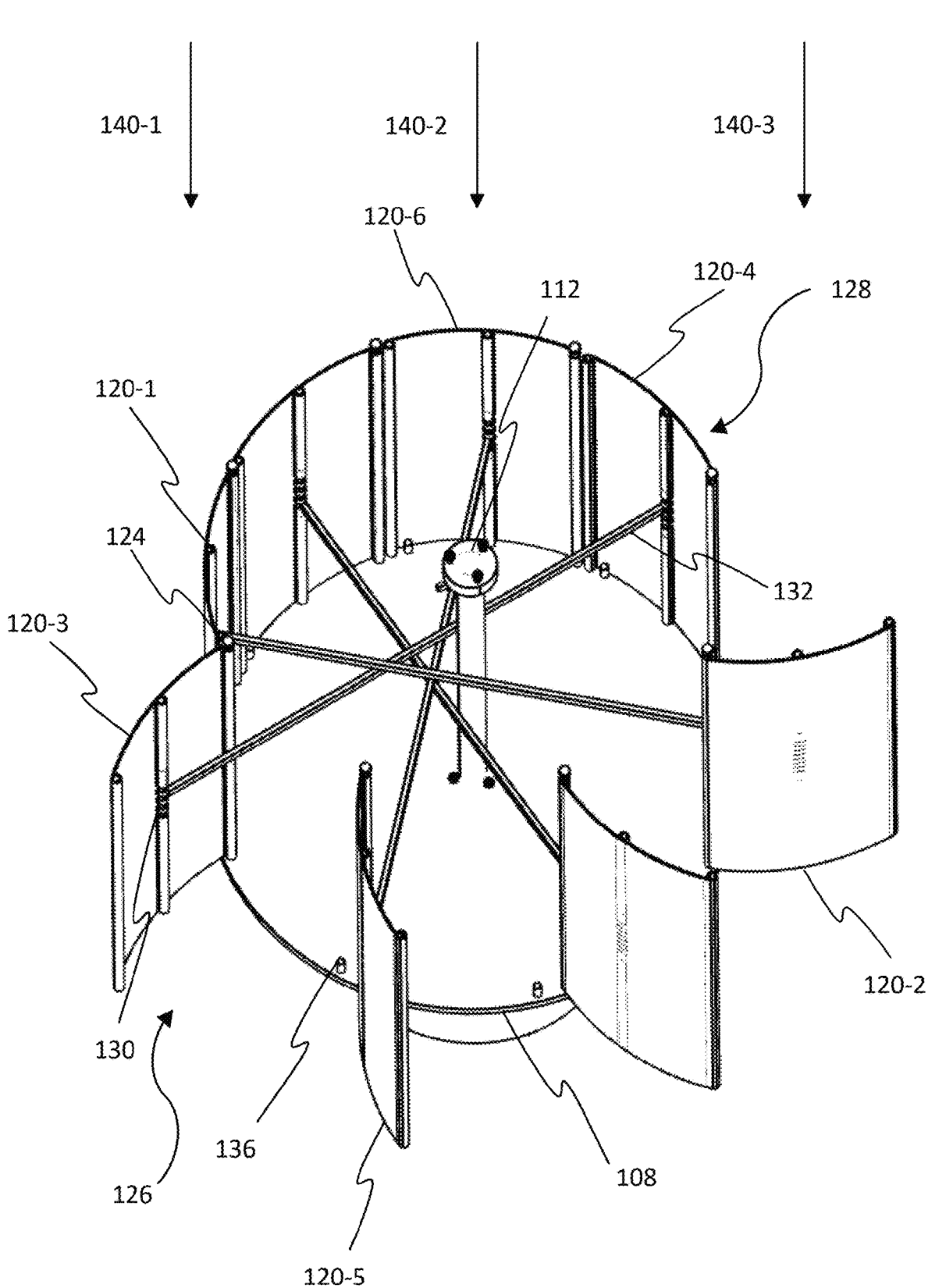
FIG. 2 shows a perspective view of the variable radius impeller of FIG. 1 without the top plate, with the blades in a first position.

FIG. 2 shows a perspective view of the variable radius impeller 100 without the top plate 104. Each pivot shaft 124 allows the corresponding blade 120 to rotate about the pivot shaft 124 to move from an open position 126 to a closed position 128, and vice versa. In a present embodiment, the pivot shaft 124 is positioned on an inner edge of the blade 120, being the edge that is closest to the central shaft 112 when the blade 120 is in the open position 126. An outer edge of the blade 120 refers to the edge that is furthest from the central shaft 112 when the blade 120 is in the open position 126. However, in other embodiments, the pivot shaft 124 does not necessarily need to be positioned at the edge of the blade 120 and can be located further inward from the inner edge, provided that the blade 120 remains capable of rotating about the pivot shaft 124 with sufficient surface area to capture wind energy.

As seen in FIG. 2, each blade 120 is connected to an opposing blade, forming opposing pairs of blades. For example, a first blade 120-1 opposes a second blade 120-2, a third blade 120-3 opposes a fourth blade 120-4, and a fifth blade 120-5 opposes a sixth blade 120-6. An actuation rod 132 is operably connected to an opposing pair of blades to coordinate movement between the opposing pair of blades.

Each blade 120 has a connecting element on the inner surface of the blade 120 that allows the blade 120 to be connected to the corresponding actuation rod 132. The actuation rod 132 connects the connecting element of the first blade 120-1 to the connecting element of the second blade 120-2. In a present embodiment, the connecting element comprises a connecting shaft 130 that extends along a longitudinal axis of the inner surface of the blade 120. The connecting shaft 130 can be parallel to the pivot shaft 124. The connecting element can further include a bearing to reduce friction. The bearing can be, for example, a roller bearing or a ball bearing.

Further, each actuation rod 132 is connected to the corresponding opposing pair of blades at vertically offset positions relative to adjacent actuation rods 132 to prevent mechanical interference between actuation rods 132 during movement of the plurality of blades 120, as seen in FIG. 1. This vertical offset enables unobstructed blade operation, reducing the risk of mechanical jamming or friction that could impede movement, and allowing for smoother and more synchronized actuation of the blades 120.

As shown in FIG. 2, the variable radius impeller 100 has a plurality of stop members 136. Each stop member 136 is positioned to limit a range of motion of a corresponding blade 120 as the blade moves in a closing direction. When the blade 120 comes into contact with the stop member 136, the blade 120 has reached the closed position 128.

Figure 3:
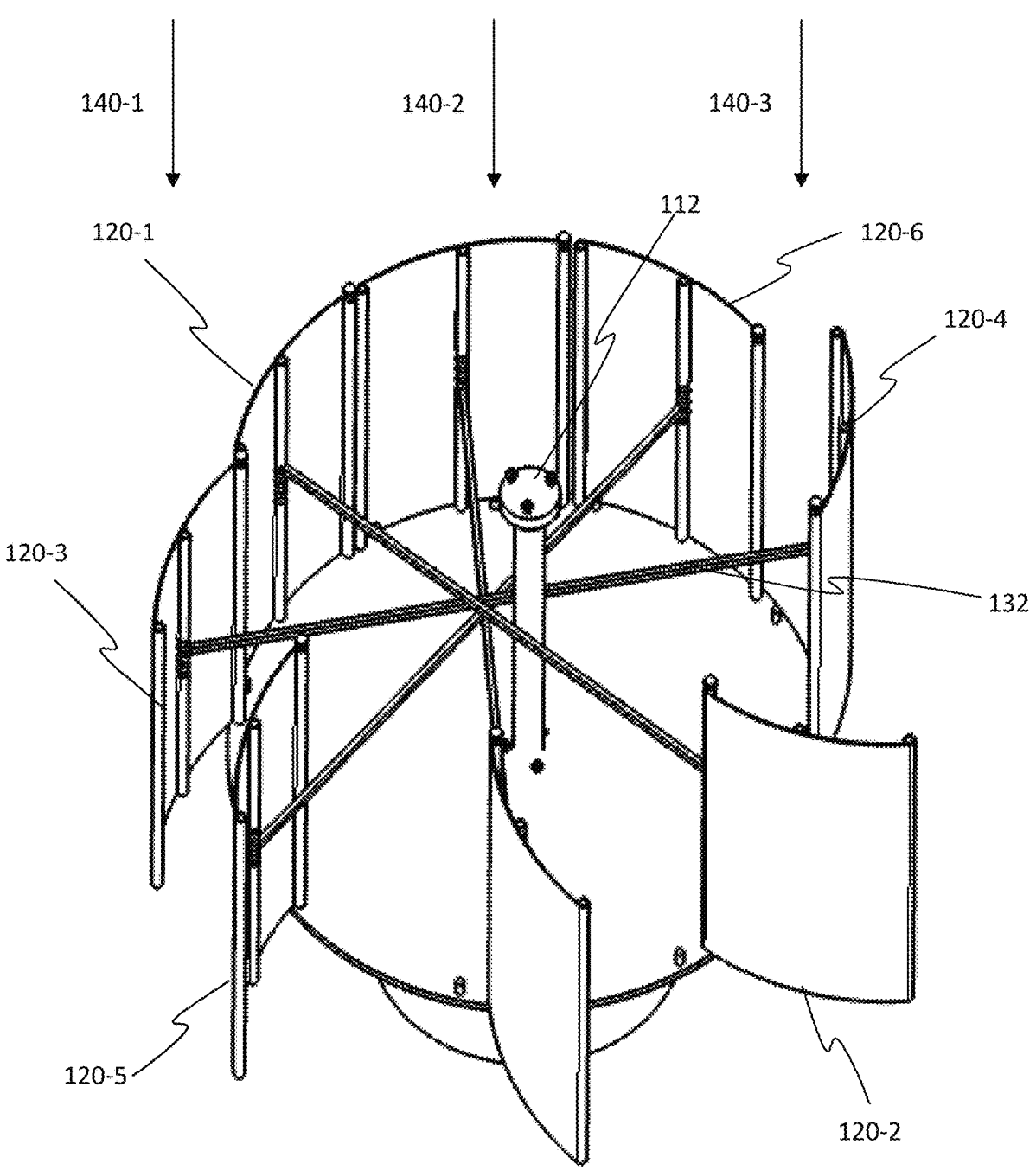
FIG. 3 shows a perspective view of the variable radius impeller of FIG. 1 without the top plate, with the blades in a second position.
Figure 4:
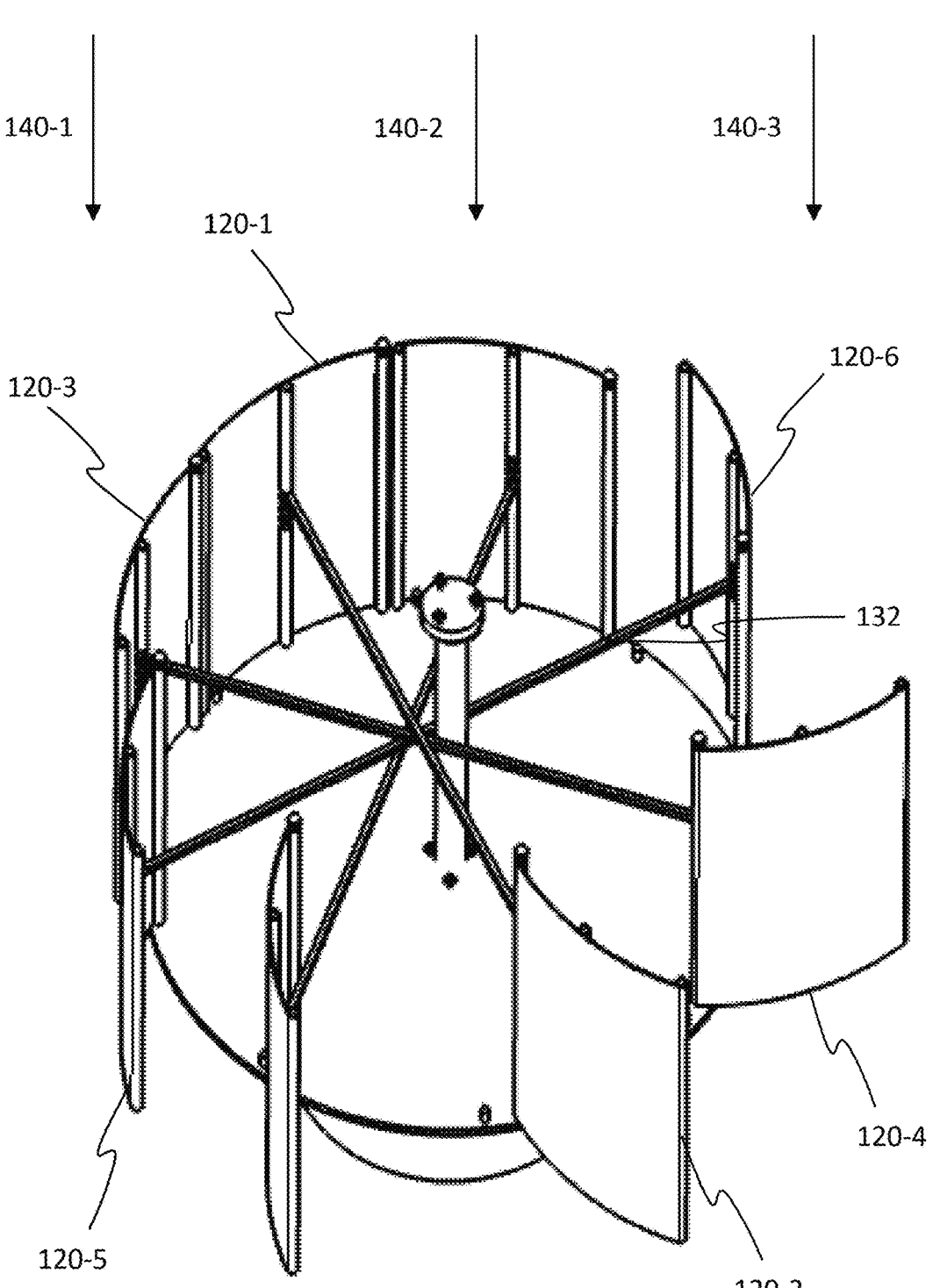
FIG. 4 shows a perspective view of the variable radius impeller of FIG. 1 without the top plate, with the blades in a third position.

FIGS. 2 to 4 illustrate the exemplary movement and positioning of the blades 120 during operation, demonstrating how the blades dynamically adjust to optimize wind capture. FIG. 2 shows the blades in a first position, FIG. 3 shows the blades in a second position, and FIG. 4 shows the blades in a third position.

In FIG. 2, wind, shown as the arrows at 140-1, 140-2, 140-3 (collectively referred to as 140), is directed toward one side of the variable radius impeller 100. Blades 120 whose inner surfaces come into contact with the wind 140 when the blades 120 are in the open position 126 are referred to as "windward blades", while blades 120 whose outer surfaces come into contact with the wind 140 when the blades are in the open position 126 are referred to as "leeward blades". In FIG. 2, the first blade 120-1 is a leeward blade and the second blade 120-2 is a windward blade. The first blade 120-1 is shown in the closed position 128 and the second blade 120-2 is shown in the open position 126. A driving force of the wind 140-1 acts on the outer surface of the first blade 120-1 to keep the first blade 120-1 in the closed position 128. The wind 140-2 is directed toward the axis of rotation and does not significantly contribute to rotation. A driving force of the wind 140-3 acts on the inner surface of the second blade 120-2, keeping the second blade 120-2 in the open position 126.

FIG. 3 shows the variable radius impeller 100 in a second position, as it rotates clockwise due to the driving force of the wind 140-3 acting on the second blade 120-2. The driving force of the wind 140-1 now acts on the third blade 120-3, causing the third blade 120-3 to move in the closing direction toward the axis of rotation. Movement of the third blade 120-3 in the closing direction causes the corresponding actuation rod 132 to simultaneously push the fourth blade 120-4 in the opening direction, away from the axis of rotation. As the fourth blade 120-4 is pushed in the opening direction, the inner surface of the fourth blade 120-4 is exposed to the driving force of the wind 140-3, allowing the fourth blade 120-4 to capture the wind 140-3 and accelerate movement of the fourth blade 120-4 to the open position 126. Therefore, the driving force of the wind 140-1 acts to close the leeward blades, while the driving force of the wind 140-3 assists with opening the windward blades, increasing the rotational efficiency of the variable radius impeller 100.

FIG. 4 shows the variable radius impeller 100 in a third position as it continues to rotate clockwise. The third blade 120-3 is nearly in the closed position 128, and the fourth blade 120-4 is nearly in the open position 128. The driving force of the wind 140-1 begins to act on the outer surface of the fifth blade 120-5, another leeward blade, which causes the fifth blade 120-5 to move in the closing direction toward the closed position 128. This movement simultaneously causes the corresponding actuation rod 132 to push the sixth blade 120-6, another windward blade, in the opening direction toward the open position 126. As the sixth blade 120-6 is pushed in the opening direction and the inner surface of the sixth blade 120-6 is exposed to the driving force of the wind 140-3, the movement of the sixth blade 120-6 toward the open position 126 is accelerated. This cycle continues as the variable radius impeller 100 continues to rotate.

Figure 5:
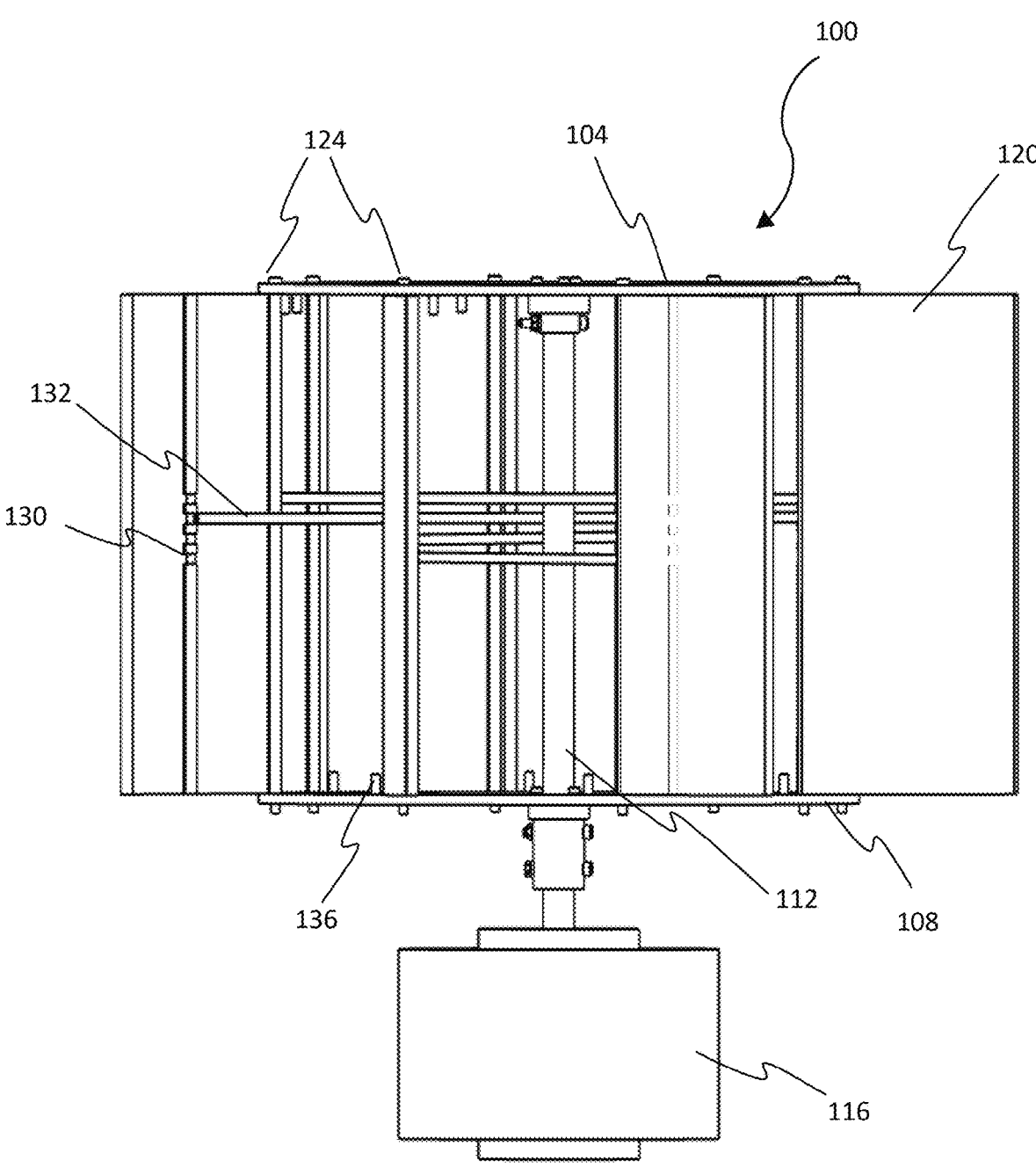
FIG. 5 shows a front view of the variable radius impeller of FIG. 1.

FIG. 5 shows a front view of the variable radius impeller 100. As discussed above, in a present embodiment, the frame assembly 102 comprises the top plate 104, the bottom plate 108, and the central shaft 112, which extends through the bottom plate 108 and is configured for coupling to the generator 116. In operation, the frame assembly 102 rotates relative to the generator 116. Blades 120 are each connected to the frame assembly 102 by a corresponding pivot shaft 124. Each blade 120 also has a corresponding connecting element 130, and the connecting elements 130 of opposing blades 120 are connected via the corresponding actuation rod 132. FIG. 5 also illustrates the vertically offset positions of the actuation rods 132 relative to one another, as well as the stop members 136.

Figure 6:
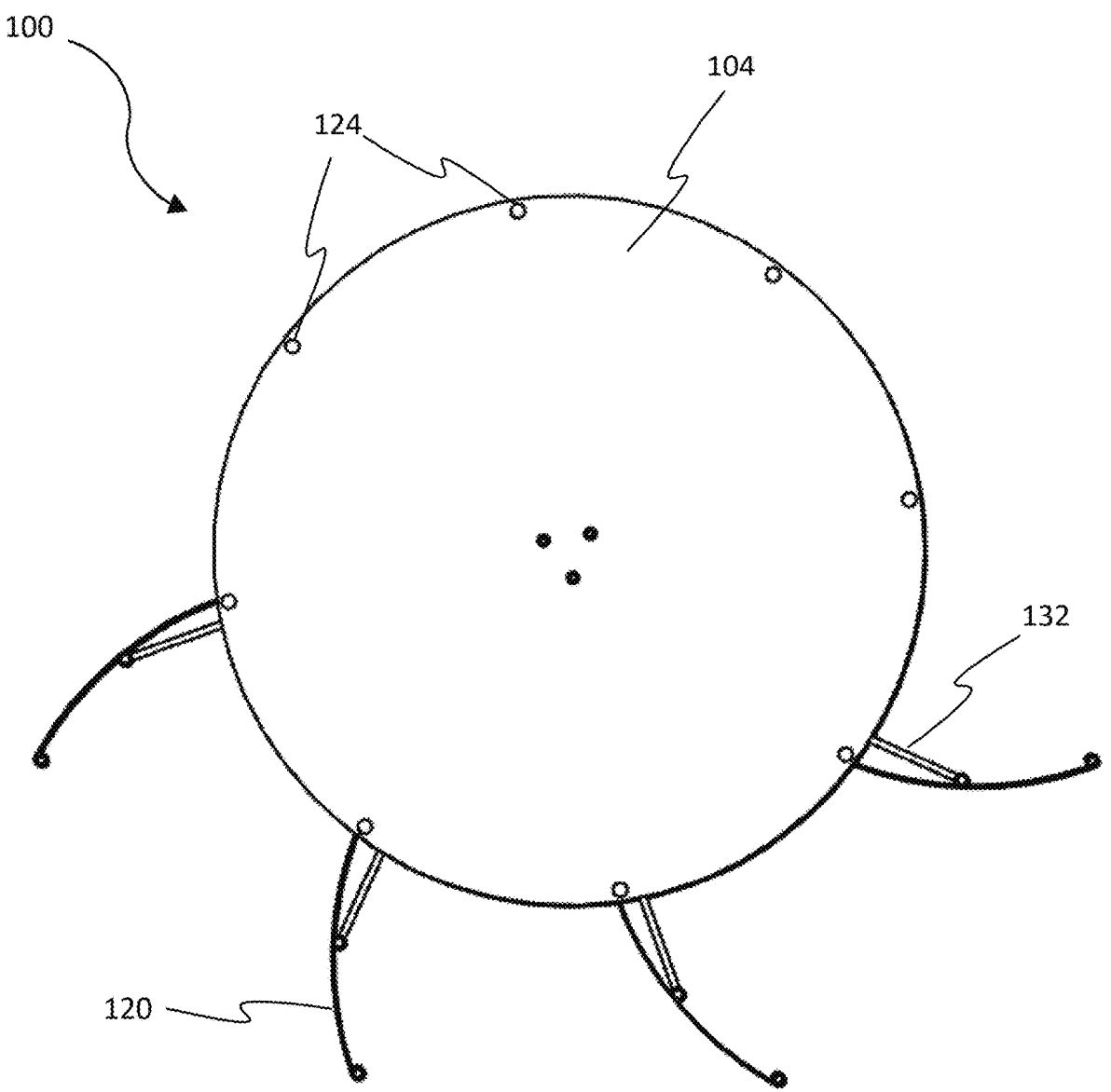
FIG. 6 shows a top view of the variable radius impeller of FIG. 1.

FIG. 6 is a top view of the variable radius impeller 100, showing the pivot shafts 124 connecting the blades 120 to the top plate 104 and the actuation rods 132 connected to the blades 120.

Figure 7:
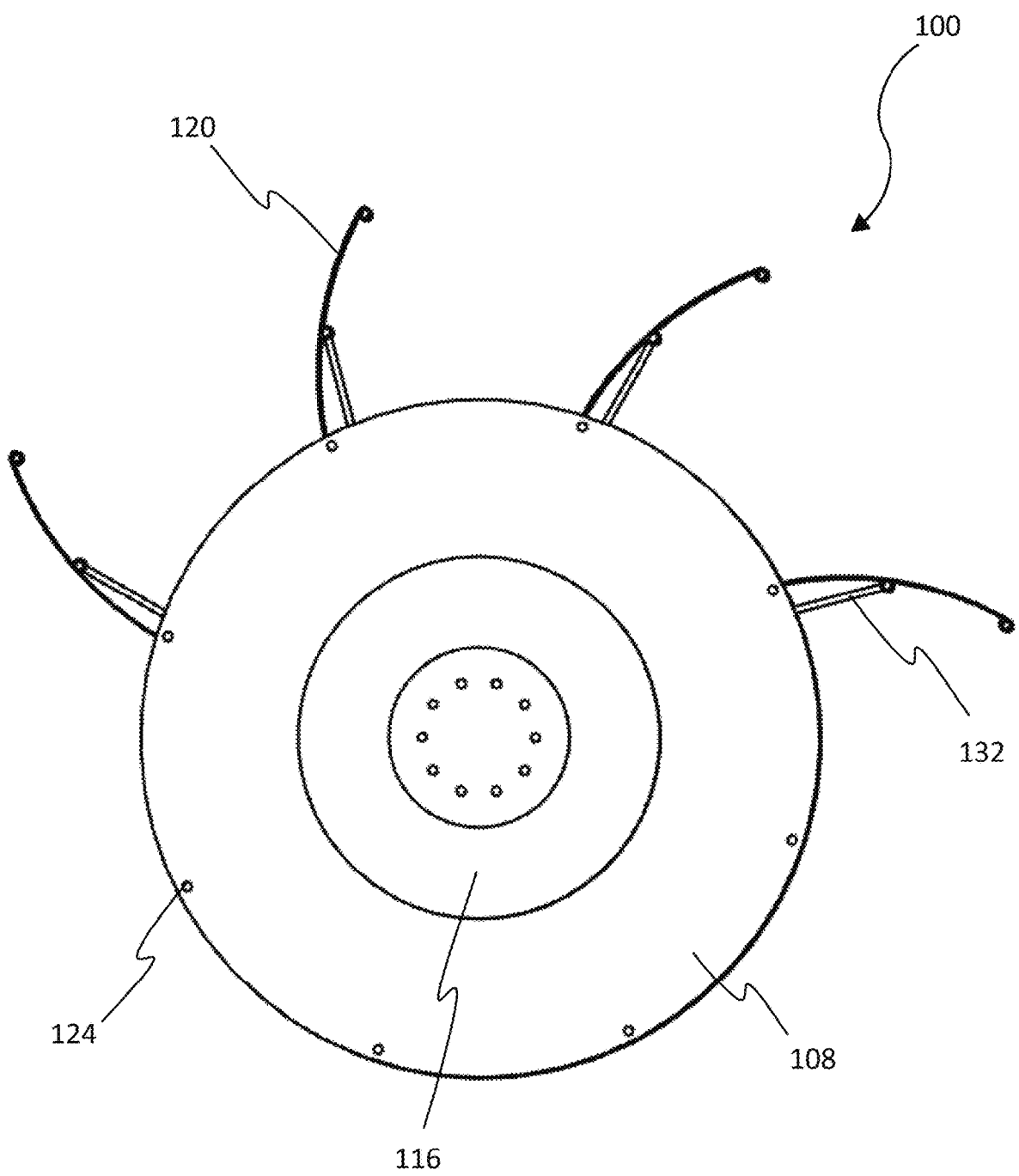
FIG. 7 shows a bottom view of the variable radius impeller of FIG. 1.

FIG. 7 is a bottom view of the variable radius impeller 100, showing the pivot shafts 124 connecting the blades 120 to the bottom plate 108, the actuation rods 132 connected to the blades 120, and the generator 116.

During operation, the variable radius impeller 100 dynamically adjusts its blade positions to optimize wind interaction and rotational efficiency. As wind 140 flows toward the variable radius impeller 100, the leeward blades are naturally pushed in the closing direction by the driving force of the wind 140-1, toward the closed position 128. This movement reduces their radial distance to the central shaft 112 and decreases resistance by presenting less surface area to the oncoming wind. The leeward blades, by moving to the closed position, simultaneously cause the windward blades to move in the opening direction toward the open position 126, allowing them to catch the driving force of the wind 140-3. By increasing their effective radius, the windward blades capture the maximum driving force from the wind, maximizing the rotational force applied to the central shaft 112. This coordinated movement is facilitated by the actuation rods 132, which mechanically link the opposing pairs of blades to ensure synchronized motion. As the variable radius impeller 100 continues rotating, each blade 120 alternates between the closed position 128, where it reduces wind resistance, and the open position 126, where it captures wind energy. This self-regulating mechanism enhances efficiency by ensuring that only the necessary blades are exposed to the driving force of the wind. Additionally, the vertically offset actuation rods prevent mechanical interference, ensuring smooth and continuous blade transitions.

The present specification provides a variable radius impeller that has various advantages over the prior art.

The present specification provides a variable radius impeller in which a radial position of the blades relative to an axis of rotation defined by the frame assembly dynamically changes during operation, enhancing efficiency and allowing for optimized wind energy capture. The coordinated movement of opposing pairs of blades, facilitated by actuation rods, ensures that energy losses from counteracting wind resistance are minimized, thereby improving overall rotational efficiency. This design also allows the wind-facing blades to remain windward for longer durations, optimizing energy capture and further enhancing rotational efficiency.

The variable radius impeller also enables better startup performance, as the design of the variable radius impeller ensures that at least some blades are partially open at startup, allowing them to immediately capture wind force and initiate rotation. This design reduces the minimum wind speed required to initiate motion, allowing startup even in low wind environments.

The vertically offset actuation rods prevent mechanical interference, allowing for smooth and uninterrupted blade movement, reducing wear and maintenance requirements.

The variable radius impeller provides greater adaptability to fluctuating wind conditions, leading to more consistent power generation and increased energy output.

Additionally, this design incorporates relatively few moving parts for actuation of the blades, reducing mechanical complexity, improving reliability, and lowering maintenance costs.

The scope of the monopoly of this specification is defined by the claims, properly construed in relation to the narrative and drawings. Any limiting phrases should not be viewed in isolation but in view of the broader context of the entire teachings and advantages afforded by the specification.

The invention claimed is:

1. A variable radius impeller comprising:
a frame assembly configured for coupling to a generator;
a plurality of blades for generating rotational force around an axis of rotation defined by the frame assembly, each blade rotatably mounted to the frame assembly; and
a plurality of actuation rods, each actuation rod operably connected to an opposing pair of the plurality of blades, the opposing pair comprising a first blade and a second blade;
wherein a driving force of wind on an outer surface of the first blade causes the first blade to move in a closing direction to decrease wind resistance, which in turn causes the corresponding actuation rod to simultaneously push the second blade in an opening direction to increase wind capture.

2. The variable radius impeller of claim 1, wherein the frame assembly comprises:
a top plate;
a bottom plate spaced apart from the top plate; and
a central shaft connected to the top plate and extending through the bottom plate, the central shaft configured for coupling to the generator.

3. The variable radius impeller of claim 1, wherein the blade is rotatably mounted to the frame assembly by a pivot shaft positioned along a longitudinal side of each blade, pivotally connecting the blade to the frame assembly.

4. The variable radius impeller of claim 1, wherein each blade has a connecting element, the actuation rod connecting the connecting element of the first blade to the connecting element of the second blade.

5. The variable radius impeller of claim 4, wherein the connecting element comprises a connecting shaft extending along a longitudinal axis of each blade.

6. The variable radius impeller of claim 5, wherein the connecting element further comprises a bearing for reducing friction.

7. The variable radius impeller of claim 6, wherein the bearing comprises a roller bearing or a ball bearing.

8. The variable radius impeller of claim 1, wherein each actuation rod is connected to the corresponding opposing pair of the plurality of blades at vertically offset positions relative to adjacent actuation rods to prevent mechanical interference during movement of the plurality of blades.

9. The variable radius impeller according to claim 1, wherein the frame assembly further comprises a plurality of stop members, each stop member positioned to limit a range of motion of a corresponding blade as the blade moves in the closing direction.

* * * * *